June 2, 1931. M. EHRICKE 1,807,731
OPERATOR FOR AGRICULTURAL CULTIVATING IMPLEMENTS
Filed May 24, 1926 2 Sheets-Sheet 2
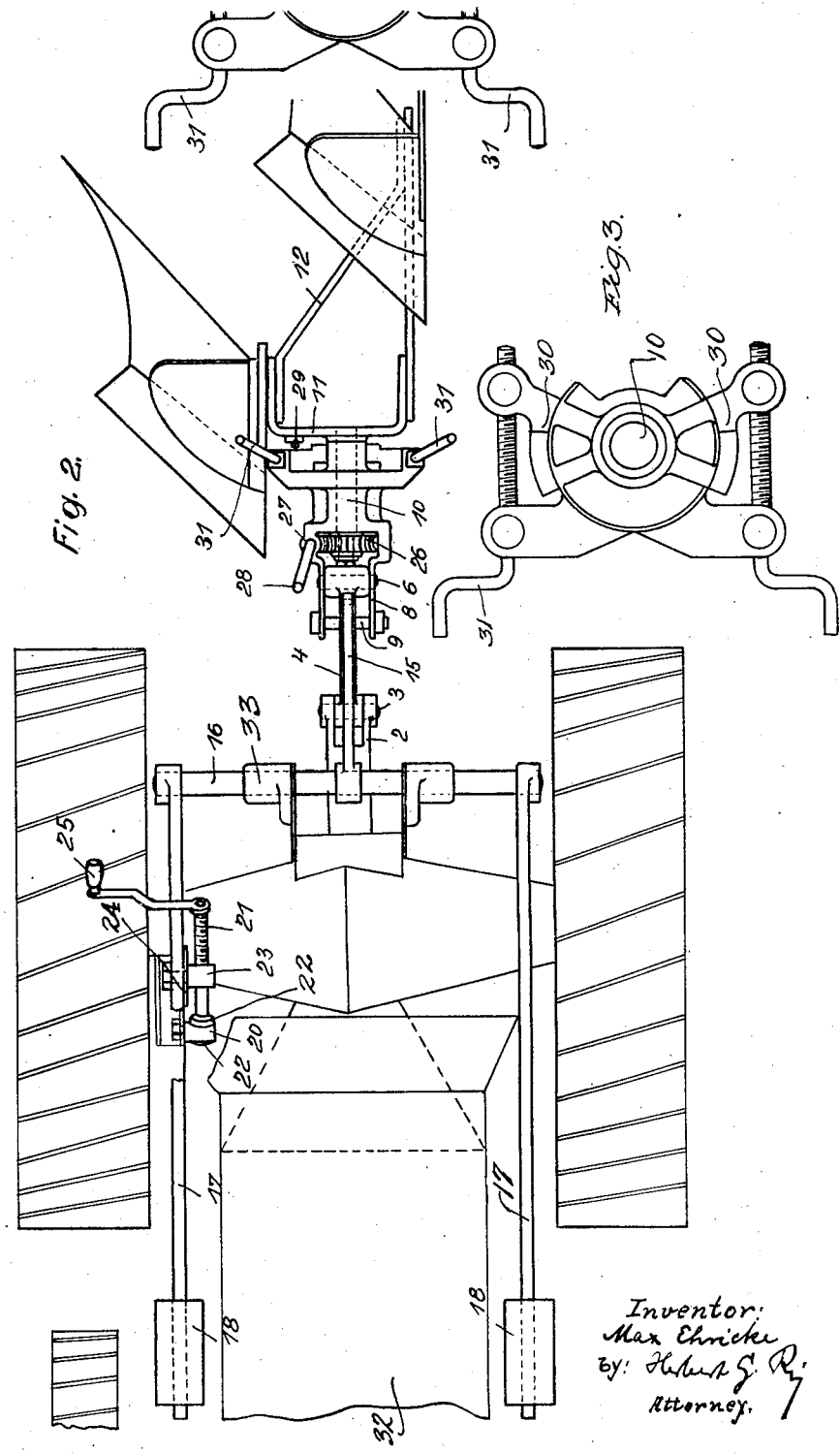

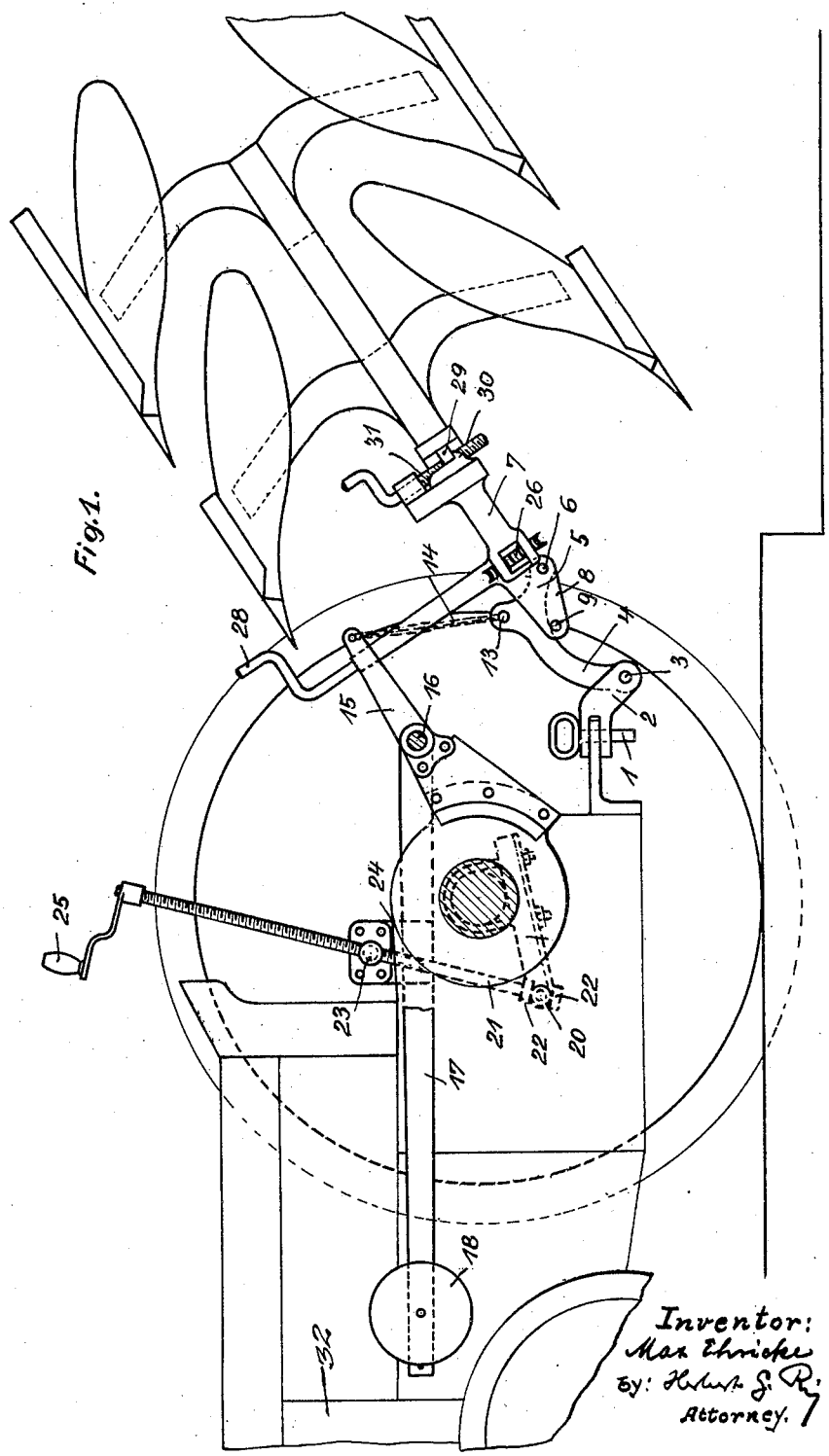

Patented June 2, 1931

1,807,731

UNITED STATES PATENT OFFICE

MAX EHRICKE, OF LEIPZIG-PLAGWITZ, GERMANY, ASSIGNOR TO THE FIRM RUD.SACK, OF LEIPZIG-PLAGWITZ, GERMANY

OPERATOR FOR AGRICULTURAL CULTIVATING IMPLEMENTS

Application filed May 24, 1926, Serial No. 111,327, and in Germany February 17, 1926.

This invention relates to tractor ploughs and more particularly to a novel arrangement of couplings for wheelless implements serving for the treatment of the soil which may especially be adapted, for instance, for so-called hill-side ploughs reversing ploughs or turnwrest ploughs. According to my invention the advantages of the wheelless construction of the soil treating implement will be fully utilized, said advantages consisting in the possibility of easily turning or reversing the motion of the plough.

My invention is illustrated by way of example in the accompanying drawings, wherein Fig. 1 is a side view of a hill-side plough, reversing plough or the like with the new coupling by means of which the wheelless implement serving for the treatment of the soil may be lifted and lowered, the traction engine being shown with one of its rear wheels taken off, Fig. 2 a plan-view taken on Fig. 1, and Fig. 3 a detail view of the device serving for the lateral adjustment of the plough-shares of said wheelless implement.

Referring now more particularly to the drawings, on the rear part of the traction engine 32 there is shown the coupling member 2 which is secured to said tractor by means of the bolt 1 to permit swinging of said coupling member in an horizontal plane. A triple-armed lever 4 or supporting arm is pivoted by means of the bolt 3 to said coupling member 2 in such a manner, that said lever may be swung in a vertical plane. The arm 5 of the lever 4 carries a bolt 6, by means of which the bearing member 7 is mounted in such a manner, that it may also be rotated in a vertical plane. This bearing member 7 is shaped at its forward end in the manner of a fork 8 which carries a pivot or bolt 9 serving as a stop for limiting the swinging motion of the bearing member 7 towards the lever 4. The support for the soil treating implement is therefore composed of the triple-armed lever 4, the bearing-member 7 and the fork 8.

The bolt 10 is rotatably mounted within said bearing member 7, said bolt 10 carrying the fork-shaped holder 11, to which the frame 12 of the soil treating implement is secured.

The upwardly extending arm 13 of the lever 4 is connected by means of a chain 14 to a lever 15 fast on the shaft 16 which is mounted within the frame of the traction-engine, as indicated in Fig. 2, by means of the bearings 33. The shaft 16 as may be seen from Fig. 2 carries two further levers 17 which are equipped at their extremities with weights 18, serving as a counter-weight for balancing the weight of the soil treating implement supported by the lever or supporting arm 4. The weights 18 may obviously be replaced by springs. By means of the chain 14 the coupling member 2 may be swung in an horizontal plane around the bolt 1.

Fixed to the rear part of the tractor-frame is a forked arm 19 and an intermediate the fork of the arm 19 there is pivotally mounted a supporting body 20 for the threaded spindle 21 in such a manner, that said supporting body may be rotated in a vertical plane. The spindle 21 is held against longitudinal displacement by means of the collars 22 and engages with a nut 23, which is mounted on a bracket 24, secured to one of the weighted levers 17. The nut 23 may be rotated in a vertical plane within said bracket 24. By rotating the spindle 21 by means of the crank-lever 25, the one of the weighted levers 17 will be adjusted. By this the shaft 16 will be rotated and at the same time by the aid of the lever 15 and the chain 14 a swinging of the lever or arm 4 together with the bearing member 7 and the holder 11 will be effected. In this manner the soil treating implement is thrown into or out of engagement with the ground.

The reversing of the soil treating implement, for changing the direction of operation is effected by means of a mechanical device, which is formed by a worm-wheel 26, rigidly secured to the bolt 10, and a worm 27, meshing with said worm-wheel and adapted to be rotated by a crank-lever 28.

The frame 12 of the soil treating implement is so adjusted by the rotation of the crank-lever 28, that the stop 29 provided on the holder 11, will engage with one of the two adjustable dogs 30, which limit the range of movement of said frame and therewith of the soil treating implement. The dogs 30 can be adjusted by means of the threaded spindles 31 which are provided with crank-levers as shown in Fig. 3. By this the plough-shares forming part of the soil treating implement may be adjusted to a different operative position.

In order to bring the soil treating implement from its position for transportation, as shown in Fig. 1 in full lines, into its position for operation, the driver of the traction-engine will have to rotate the crank-lever 25 in such a manner, that the weighted lever 17 will be swung in upward direction, whereby the lever 15 as well as the lever 4 which is connected thereto by the chain 14, will be swung in downward direction. In consequence thereof the soil treating implement which is supported by the lever 4 will come in engagement with the ground by action of gravity. The extent to which the plough-shares provided on said implement penetrate into the ground may be varied by properly adjusting the spindle 21. The position of the stop or pivot 9 is so chosen, that it will rest against the supporting arm 4 in every position of the soil treating implement which is intermediate its uppermost position, that is the position of transportation, and that position which will be assumed by said implement during ploughing to the smallest possible depth. If it is intended to plough to a greater depth, the soil treating implement will remain in horizontal position, while the stop 9 is at a certain distance from the supporting arm or lever 4. At the end of the furrow the weighted lever 17 is returned into the position for transportation by rotating the spindle 21 by means of the crank-lever 25. Reversing of the soil treating implement may be accomplished by rotating the crank-lever 28.

I claim:

1. A device to be used in connection with traction engines for agricultural implements serving for the treatment of the soil, said device comprising an agricultural implement, a support mounted rotatably in a vertical plane on a traction engine, means for fixing said agricultural implement to said support so that the total weight of said implement will be transmitted to said support in raised condition of said implement, and lifting means adapted to act on said support to so adjust the latter that it will carry said implement in freely lifted condition.

2. A device as specified by claim 1 having a support which is rotatable also in an horizontal plane, lifting means in the form of an adjusting lever, and a chain interposed between said adjusting lever and said support.

3. A device to be used in connection with traction engines for agricultural implements serving for the treatment of the soil, said device comprising an agricultural implement, a support carried by a traction-engine and adapted to secure said implement to said traction-engine, means whereby said support may be swung in a vertical as well as in an horizontal plane, a pivotally mounted lever carrying a counter-weight, a threaded spindle operatively connected with said lever, said support including two parts which are pivotally connected with each other, and a stop adapted to limit the relative motion between said parts.

4. A device as specified by claim 1, wherein the implement consists of a plough member which is mounted rotatably around its longitudinal axis.

5. A device as specified by claim 1, wherein the implement consists of a plough member mounted rotatably around, its longitudinal axis, said device including a frame associated with said implement, and a holder for said frame, said holder being mounted rotatably around the axis of rotation of said implement.

6. A device as specified by claim 1, wherein the implement consists of a plough member which is mounted rotatably around its longitudinal axis, said device including a frame forming part of said plough member, a holder for said frame, said holder being mounted rotatably around the axis of rotation of said plough-member, a pair of adjustable stops adapted to limit motion of said holder, and a crank-lever connected by means of a gearing device to said holder and permitting the rotation of said holder and said implement.

In testimony whereof I affix my signature.

MAX EHRICKE.